(12) United States Patent
Eytchison (10) Patent No.: US 7,844,738 B2
(45) Date of Patent: Nov. 30, 2010

(54) METHOD OF AND APPARATUS FOR BRIDGING A UPNP NETWORK AND A RENDEZVOUS NETWORK

(75) Inventor: Edward Eytchison, Milpitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1131 days.

(21) Appl. No.: 10/759,557

(22) Filed: Jan. 16, 2004

(65) Prior Publication Data

US 2005/0160172 A1 Jul. 21, 2005

(51) Int. Cl.
 *G06F 15/16* (2006.01)
(52) U.S. Cl. .................. 709/246; 709/230; 709/249
(58) Field of Classification Search ................ 370/401; 709/227, 230, 246, 249; 713/1
See application file for complete search history.

(56) References Cited

U.S. PATENT DOCUMENTS

| | | | |
|---|---|---|---|
| 6,725,281 B1 * | 4/2004 | Zintel et al. ................. 719/318 |
| 6,957,275 B1 * | 10/2005 | Sekiguchi .................... 709/245 |
| 7,130,895 B2 * | 10/2006 | Zintel et al. ................. 709/220 |
| 7,171,475 B2 * | 1/2007 | Weisman et al. ............ 709/227 |
| 2002/0029256 A1 * | 3/2002 | Zintel et al. ................. 709/218 |
| 2002/0078161 A1 * | 6/2002 | Cheng ......................... 709/208 |
| 2002/0112058 A1 * | 8/2002 | Weisman et al. ............ 709/227 |
| 2002/0133581 A1 * | 9/2002 | Schwartz et al. ............ 709/223 |
| 2002/0147791 A1 * | 10/2002 | Choi ............................ 709/217 |
| 2003/0016682 A1 * | 1/2003 | Cho ............................. 370/401 |
| 2003/0105778 A1 * | 6/2003 | Andani ........................ 707/200 |
| 2003/0105854 A1 * | 6/2003 | Thorsteinsson et al. ..... 709/223 |
| 2003/0110298 A1 * | 6/2003 | Lanigan ....................... 709/246 |
| 2003/0110334 A1 * | 6/2003 | Lanigan et al. ................ 710/72 |
| 2003/0217136 A1 * | 11/2003 | Cho et al. .................... 709/223 |
| 2004/0019395 A1 * | 1/2004 | Maymudes ................... 700/65 |
| 2004/0120344 A1 * | 6/2004 | Sato et al. ................... 370/465 |
| 2005/0021852 A1 * | 1/2005 | Accarie et al. .............. 709/245 |
| 2005/0044355 A1 * | 2/2005 | Cheshire ..................... 713/163 |
| 2005/0108320 A1 * | 5/2005 | Lord et al. ................... 709/201 |

* cited by examiner

*Primary Examiner*—Aaron Strange
(74) *Attorney, Agent, or Firm*—Haverstock & Owens LLP (57) ABSTRACT

A UPnP rendezvous bridge appropriately bridges a UPnP network with a rendezvous network. The UPnP rendezvous bridge appropriately allows device and service discovery and converts communications directed between devices within the UPnP network and devices within the rendezvous network into an appropriate format for the receiving device, utilizing a UPnP proxy, a rendezvous proxy, a UPnP table and a rendezvous table. The UPnP rendezvous bridge includes a programmable microprocessor which manipulates communications into the proper format for the receiving device. The UPnP rendezvous bridge is implemented within a stand-alone device coupled between the UPnP and the rendezvous networks. Alternatively, the UPnP rendezvous bridge is implemented within an appropriately configured device in one of the networks. A protocol conversion program is stored within a read only memory (ROM) and used by the microprocessor to perform the appropriate conversions. Alternatively, the programmable microprocessor is programmed for the appropriate conversions by a device coupled to the UPnP rendezvous bridge.

44 Claims, 7 Drawing Sheets

METHOD OF AND APPARATUS FOR BRIDGING A UPNP NETWORK AND A RENDEZVOUS NETWORK

FIELD OF THE INVENTION

The present invention relates to the field of communications between devices within a network configuration operating under multiple protocols. More particularly, the present invention relates to the field of discovering, accessing and controlling devices and converting and directing communications between devices, operating under different protocols, within a network configuration.

BACKGROUND OF THE INVENTION

The Universal Plug and Play (UPnP) standard is designed to enable simple and robust connectivity among stand-alone devices and personal computers (PCs) from many different vendors. With UPnP, a device can dynamically join a network, obtain an Internet Protocol (IP) address, convey its capabilities, and learn about the presence and capabilities of other devices. Devices can subsequently communicate with each other directly, thereby enabling discovery and control of devices. UPnP uses standard Transmission Control Protocol/Internet Protocol (TCP/IP) and Internet protocols which facilitates interoperability with existing networks.

The basic building blocks of a UPnP network are devices, services and control points. A UPnP device is a container of services and nested devices. Different categories of UPnP devices are associated with different sets of services and embedded devices. For instance, services within a video cassette recorder (VCR) are different than those within a printer. The set of services provided by a particular device, as well as a list of properties associated with the particular device, are captured in a device description document that the device must host. This device description document is written in Extensible Markup Language (XML).

A service exposes actions and models its state with state variables. For instance, a clock service can be modeled as having a state variable, current_time, which defines the state of the clock, and two actions, set_time and get_time, which enables control of the service. Similar to the device description, this information is part of a service description document written in XML. The UPnP Forum defines UPnP Device and Service Descriptions according to a common architecture. A pointer, such as a Uniform Resource Locator (URL), to each appropriate service description document is included within a device description document. Devices may include multiple services.

A service in a UPnP device includes a state table, a control server and an event server. The state table models the state of the service through state variables and updates them when the state changes. The control server receives action requests, such as set_time, executes the action requests, updates the state table and returns responses. The event or media server publishes events to interested subscribers anytime the state of the service changes. For instance, a fire alarm service sends an event to interested subscribers when its state changes to "ringing."

A control point in a UPnP network is a controller capable of discovering and controlling other devices. After discovery of a network device, a control point can retrieve the device description and get a list of associated services, retrieve service descriptions for available services and invoke actions to control the service. The control point can also subscribe to the service's event source such that anytime the state of the service changes, the event server sends an event to the control point.

UPnP uses open, standard protocols such as TCP/IP, HyperText Transport Protocol (HTTP) and XML. Using these standardized protocols aids in ensuring interoperability between vendor implementations. Other technologies can also be used to network devices together. Such technologies include networking technologies such as Home Audio Video Interoperability (HAVi), Consumer Electronic Bus (CEBus), LonWorks, European Installation Bus (EIB), or X10. These too can participate in the UPnP network through a UPnP bridge or proxy.

Figure 1:
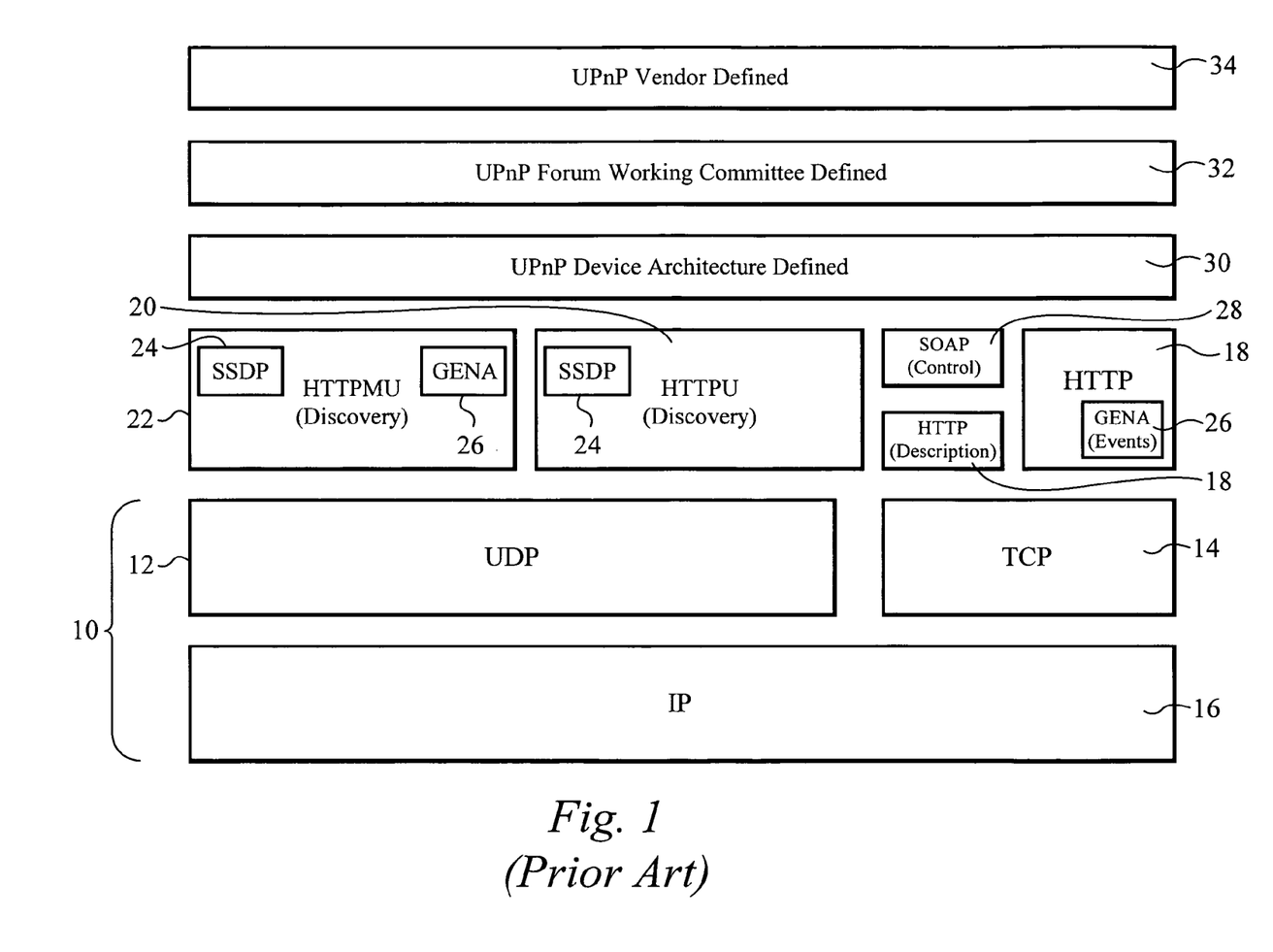
FIG. 1 illustrates a conventional protocol stack used to implement UpnP.

A conventional protocol stack used to implement UPnP is illustrated in FIG. 1. The protocol stack includes a TCP/IP networking protocol stack 10, an HTTP layer 18, an HTTPU (HTTP unicast over User Datagram Protocol (UDP)) layer 20, an HTTPMU (HTTP multicast over UDP) layer 22, an SSDP (Simple Service Discovery Protocol) layer 24, a GENA (General Event Notification Architecture) layer 26, a SOAP (Simple Object Access Protocol) layer 28, a UPnP Device Architecture Defined layer 30, a UPnP Forum Working Committee Defined layer 32 and a UPnP Vendor Defined layer 34. The TCP/IP protocol stack 10 includes an IP layer 16, a TCP layer 14 and a UDP layer 12. The TCP/IP networking protocol stack 10 serves as the base on which the rest of the UPnP protocols are built. By using the standard, prevalent TCP/IP protocol suite, UPnP leverages the protocol's ability to span different physical media and ensures multiple vendor interoperability. UPnP devices can use many of the protocols in the TCP/IP protocol suite including TCP, UDP, IGMP (Internet Group Multicast Protocol), ARP (Address Resolution Protocol) and IP, as well as TCP/IP services such as DHCP (Dynamic Host Configuration Protocol) and DNS (Domain Name System). TCP/IP provides the base protocol stack for network connectivity between UpnP devices.

All aspects of UPnP build on top of HTTP or its variants. HTTPU and HTTPMU are variants of HTTP defined to deliver messages on top of UDP/IP instead of TCP/IP. HTTPU and HTTPMU are protocols used by SSDP, which is described below. The basic message format used by HTTPU and HTTPMU adheres with that of HTTP and is required both for multicast communication and when message delivery does not require the overhead associated with reliability.

SSDP provides a mechanism for discovering network devices on the network. SSDP is built on HTTPU and HTTPMU and defines methods both for a control point to locate resources on the network, and for devices to announce their availability on the network. By defining the use of both search requests and presence announcements, SSDP eliminates the overhead that would be necessary if only one of these mechanisms is used. As a result, every control point on the network has complete information on network state while keeping network traffic low.

Both control points and devices use SSDP. A UPnP control point, upon booting up, can send a multicast SSDP search request over HTTPMU to discover devices that are available on the network. The control point can refine the search to find only devices of a particular type, such as a VCR, particular services, such as devices with clock services, or even a particular device. UPnP devices listen to the multicast port. Upon receiving a search request, the device examines the search criteria to determine if they match. If a match is found, a unicast SSDP over HTTPU response is sent to the control point. Similarly, a device, upon being connected to the network, sends out multiple SSDP presence announcements advertising itself.

Both presence announcements and unicast device response messages include a pointer to the location of the device description document, which has information on the set of properties and services supported by the device.

The process involved in UpnP networking includes addressing, discovery, description, control, eventing and presentation. UPnP provides support for communication between control points and devices. The network media, the TCP/IP protocol suite and HTTP provide basic network connectivity and addressing. On top of these open, standard, Internet based protocols, UPnP defines a set of HTTP servers to handle discovery, description, control, events and presentation.

Each device includes a DHCP client that searches for a DHCP server when the device is first connected to the network. If a DHCP server is available, the device uses the IP address assigned to it. If no DHCP server is available, the device uses Auto IP to get an address.

Once devices are attached to the network and addressed appropriately, discovery can take place. Discovery is handled by the SSDP, as discussed above. When a device is added to the network, SSDP enables the device to advertise its services to control points on the network. When a control point is added to the network, SSDP enables the control point to search for devices on the network. The fundamental exchange in both cases is a discovery message containing a few, essential specifics about the device or one of its services, for example its type, identifier, and a pointer to its XML device description document.

The next step in UPnP networking is description. After a control point discovers a device, the control point still knows very little about the device. For the control point to learn more about the device and its capabilities, or to interact with the device, the control point must retrieve the device's description from the URL provided by the device in the discovery message.

Devices can include other logical devices and services. The UPnP description for a device is expressed in XML and includes vendor-specific, manufacturer information including the model name and number, serial number, manufacturer name, URLs to vendor-specific Web sites, and so forth. The description also includes a list of any embedded devices or services, as well as URLs for control, eventing and presentation.

After the control point has retrieved a description of the device, the control point has the essentials for device control. To learn more about the service, the control point must retrieve a detailed UPnP description for each service. The description for a service is also expressed in XML and includes a list of the commands, or actions, the service responds to, and parameters or arguments, for each action. The description for a service also includes a list of variables. These variables model the state of the service at run time, and are described in terms of their data type, range, and event characteristics.

To control a device, the control point sends an action request to a device's service. To do this, the control point sends a suitable control message to the control URL for the service that is provided in the device description. Control messages are expressed in XML using SOAP. In response to the control message, the service returns action specific values or fault codes.

UPnP architecture defines the general interaction between UPnP control points and UPnP network devices containing audio/video (AV) media. The UPnP architecture is independent of any particular device type, content format, and transfer protocol. The UPnP architecture enables a UPnP control point to discover UPnP network devices within a network, and to enumerate the content available on each discovered UPnP network device. Each UPnP network device uses a UPnP Content Directory Service to compile detailed information about each content item on the UPnP network device. Each content item that is referenced by the Content Directory Service includes various information about the content item including the transfer protocol(s) and file format(s) that the UPnP network device storing the content item can use to transfer the content item to another UPnP network device.

In general, a UPnP control point discovers UPnP network devices within a network. The control point interacts with the discovered devices to locate desired content. Once the content is identified, the control point identifies a common transfer protocol and data format that can be used to transfer the content from the UPnP network device on which the content is located and a UPnP network device to which the content is to be transferred. After these transfer parameters are established, the control point controls the flow of content. The actual transfer of the content is performed directly by the two UPnP network devices. The content transfer happens independently from the control point and does not involve the UPnP protocol. The control point uses UPnP to initialize the transfer of the content, but the transfer is performed using a transfer protocol other than UPnP.

Rendezvous is a networking protocol which proposes zero configuration IP networking. The rendezvous protocol allows two or more computers to be brought up on a local area network and without any manual configuration whatsoever, these computers can all see each other, discover available network services and communicate with each other using standard networking protocols. The rendezvous protocol does not require a server within the network. If there is no server within the network, then the devices within the rendezvous network assign themselves non-conflicting IP addresses. The rendezvous protocol utilizes the standard IP networking protocol to enable networking and service discovery.

The rendezvous protocol includes a service discovery feature, allowing computers on the network to find services available on other computers on the network without the need for any central directory server. This allows peripherals, databases, application services and other network services to all be discovered and accessed automatically by computers on the network, without any configuration or static IP assignment whatsoever. The rendezvous protocol specifies domain name services-simple discovery (DNS-SD) as its discovery mechanism. The service discovery and name resolution protocol provided by both of the DNS-SD and multicast DNS make use of existing on-the-wire DNS formats, resource record definitions and namespace. Multicast DNS provides a way to perform multicast DNS queries when there is no DNS server in a local area network. The DNS-SD protocol uses multicast DNS queries to find services and is targeted at ad-hoc networks such as in the home.

There is currently no method or apparatus for bridging devices operating according to UPnP with devices operating according to the rendezvous protocol. Accordingly, there is currently no method or apparatus for connecting devices within a UPnP network with devices in a rendezvous network.

SUMMARY OF THE INVENTION

A UPnP rendezvous bridge appropriately bridges a UPnP network of one or more devices with a rendezvous network of one or more devices. The UPnP rendezvous bridge appropriately allows device and service discovery between the UPnP network and the rendezvous network and converts communications directed between devices within the UPnP network and devices within the rendezvous network. The UPnP rendezvous bridge is coupled to the UPnP network and to the rendezvous network and converts communications between the devices into an appropriate format for the receiving device. This conversion is performed transparently so that the devices within the UPnP and rendezvous networks are not aware of the conversion performed by the UPnP rendezvous bridge. The UPnP rendezvous bridge includes a programmable microprocessor which manipulates communications into the proper format for the receiving device and then transmits the manipulated communications to the receiving device. The UPnP rendezvous bridge is implemented within a stand-alone device coupled between the UPnP network and the rendezvous network. Alternatively, the UPnP rendezvous bridge is implemented within an appropriately configured device in one of the UPnP network or the rendezvous network. A protocol conversion program is stored within a read only memory (ROM) and used by the microprocessor to perform the appropriate conversions. Alternatively, the programmable microprocessor is programmed for the appropriate conversions by a device coupled to the UPnP rendezvous bridge.

The UPnP rendezvous bridge includes a UPnP proxy and a rendezvous proxy. The UPnP proxy associates with the devices in the UPnP network. The rendezvous proxy associates with the devices in the rendezvous network. The respective proxy receives the device/service information for the devices within its network, through an XML page or DNS record, as appropriate, and passes that information to other proxy which builds the corresponding network data structures. Once a proxy receives the respective information for the devices within the other network, it builds a table that will be used to cross reference addressing and services information for the two different networks. Also, the table contains links to the addresses and services of the devices within the other network. Once a proxy receives information for a device in the other network, it generates a new device record and description in the appropriate format, DNS for the rendezvous network and XML for the UPnP network. The devices within each network can then access the devices in the other network through this generated device record. This allows the devices within the different networks to access the devices in their native protocols, with the proxies within the UPnP rendezvous bridge providing the appropriate interface and conversions. Each proxy communicates addressing and services information to the other proxy, thereby allowing devices within each network to have visibility into the other network. Each proxy is also responsible for building and maintaining the respective data entry structures into its respective network. When there is an update or status change to a device, the respective proxy corresponding to that device is responsible for notifying the other proxy of the change, which allows the other proxy to update the appropriate data entries.

To communicate with a device using the UPnP protocol, a device using the rendezvous protocol sends the communication intended for the UPnP device to the UPnP rendezvous bridge. After receiving a communication sent from a rendezvous device, the rendezvous proxy within the UPnP rendezvous bridge manipulates the communication into the appropriate format for the UPnP device, using the entry within the UPnP table corresponding to the device. The manipulated communication is then transmitted from the UPnP rendezvous bridge to the UPnP device. Likewise, to communicate with a device using the rendezvous protocol, a device using the UPnP protocol sends the communication intended for the rendezvous device to the UPnP rendezvous bridge. After receiving a communication sent from a UPnP device, the UPnP proxy within the UPnP rendezvous bridge manipulates the communication into the appropriate format for the rendezvous device, using the entry within the rendezvous table corresponding to the device. The manipulated communication is then transmitted from the UPnP rendezvous bridge to the rendezvous device.

In a first aspect, a method of bridging communications between a UPnP type device and a rendezvous type device comprises receiving a communication from the UPnP type device for the rendezvous type device, converting the communication into the rendezvous protocol thereby forming a converted communication and transmitting the converted communication to the rendezvous device. The UPnP type device is coupled within a UPnP type network of devices. The rendezvous type device is coupled within a rendezvous type network of devices. Converting the communication is performed by a conversion circuit. The conversion circuit is programmed by a selective one of the UPnP type device and the rendezvous type device.

In a further aspect, a method of bridging communications between a rendezvous type device and a UPnP type device comprises receiving a communication from the rendezvous type device for the UPnP type device, converting the communication into the UPnP protocol thereby forming a converted communication and transmitting the converted communication to the UpnP type device. The UPnP type device is coupled within a UPnP type network of devices. The rendezvous type device is coupled within a rendezvous type network of devices. Converting the communication is performed by a conversion circuit. The conversion circuit is programmed by a selective one of the UPnP type device and the rendezvous type device.

In still a further aspect, a converter configured to couple between a UPnP type device and a rendezvous type device to convert communications between the UPnP type device and the rendezvous type device into proper formats, comprises a UPnP type interface circuit configured to couple to a UPnP type device operating under a UPnP protocol, a rendezvous type interface circuit configured to couple to a rendezvous type device operating under a rendezvous protocol and a conversion circuit coupled between the UPnP type interface circuit and the rendezvous type interface circuit to convert communications directed from the UPnP type device to the rendezvous type device into the rendezvous protocol and converting communications directed from the rendezvous type device to the UPnP type device into the UPnP protocol. The UpnP type device is coupled within a UPnP network of devices. The rendezvous type device is coupled within a rendezvous network of devices. A conversion program used by the conversion circuit is stored within the conversion circuit. The conversion circuit is programmed by a selective one of the UPnP type device and the rendezvous type device. The converter is a stand-alone device. Alternatively, the converter is implemented within a selective one of the UpnP type device and the rendezvous type device. The UPnP type interface circuit comprises a UPnP proxy which maintains a table of entries each corresponding to a rendezvous type device. The rendezvous type interface circuit comprises a rendezvous proxy which maintains a table of entries each corresponding to a UPnP type device.

In another aspect, a converter configured for coupling between a UPnP type device and a rendezvous type device to convert communications between the UPnP type device and the rendezvous type device into proper formats, comprises a first means for interfacing configured for coupling to a UPnP type device operating under a UPnP protocol, a second means for interfacing configured for coupling to a rendezvous type device operating under a rendezvous protocol and means for converting coupled between the first means for interfacing and the second means for interfacing for converting communications directed from the UPnP type device to the rendezvous type device into the rendezvous protocol and converting communications directed from the rendezvous type device to the UPnP type device into the UPnP protocol. The UpnP type device is coupled within a UPnP type network of devices. The rendezvous type device is coupled within a rendezvous type network of devices. A conversion program used by the means for converting is stored within the means for converting. The means for converting is programmed by a selective one of the UPnP type device and the rendezvous type device. The converter is a stand-alone device. Alternatively, the converter is implemented within a selective one of the UPnP type device and the rendezvous type device. The first means for interfacing comprises a UPnP proxy which maintains a table of entries each corresponding to a rendezvous type device. The second means for interfacing comprises a rendezvous proxy which maintains a table of entries each corresponding to a UPnP type device.

In still another aspect, a bridge device configured for coupling between a UPnP type device and a rendezvous type device for converting communications between the UPnP type device and the rendezvous type device into proper formats, comprises a UPnP type interface circuit configured for coupling to a UPnP type device operating under a UPnP protocol, a rendezvous type interface circuit configured for coupling to a rendezvous type device operating under a rendezvous protocol and a conversion circuit coupled between the UPnP type interface circuit and the rendezvous type interface circuit for converting communications directed from the UPnP type device to the rendezvous type device into the rendezvous protocol and converting communications directed from the rendezvous type device to the UPnP type device into the UPnP protocol. The UPnP type device is coupled within a UPnP network of devices. The rendezvous type device is coupled within a rendezvous network of devices. A conversion program used by the conversion circuit is stored within the conversion circuit. The conversion circuit is programmed by a selective one of the UPnP type device and the rendezvous type device. The bridge is a stand-alone device. Alternatively, the bridge is implemented within a selective one of the UPnP type device and the rendezvous type device. The UPnP type interface circuit comprises a UPnP proxy which maintains a table of entries each corresponding to a rendezvous type device. The rendezvous type interface circuit comprises a rendezvous proxy which maintains a table of entries each corresponding to a UPnP type device.

In a further aspect, a network of devices operating under a plurality of protocols comprises one or more UPnP type devices operating under a UPnP protocol, one or more rendezvous type devices operating under a rendezvous protocol and a converter coupled to the UPnP type devices and the rendezvous type devices for converting communications between the UPnP type devices and the rendezvous type devices into proper formats, comprises a UPnP type interface circuit coupled to the UPnP type devices, a rendezvous type interface circuit coupled to the rendezvous type devices and a conversion circuit coupled to UPnP type interface circuit and the rendezvous type interface circuit for converting communications directed from the UPnP type devices to the rendezvous type devices into the rendezvous protocol and converting communications directed from the rendezvous type devices to the UPnP type devices into the UPnP protocol. A conversion program used by the conversion circuit is stored within the conversion circuit. The conversion circuit is programmed by a selective one of a UPnP type device and a rendezvous type device. The converter is a stand-alone device coupled between the UPnP type devices and the rendezvous type devices. Alternatively, the converter is implemented within a selective one of the UPnP type device and the rendezvous type device. The UPnP type interface circuit comprises a UPnP proxy which maintains a table of entries each corresponding to a rendezvous type device. The rendezvous type interface circuit comprises a rendezvous proxy which maintains a table of entries each corresponding to a UPnP type device.

DETAILED DESCRIPTION OF THE PREFERRED EMBODIMENT

A UPnP rendezvous bridge appropriately bridges a UPnP network of one or more devices with a rendezvous network of one or more devices. The UPnP rendezvous bridge appropriately allows device and service discovery between the UPnP network and the rendezvous network and converts communications directed between devices within the UPnP network and devices within the rendezvous network. The UPnP rendezvous bridge is coupled to the UPnP network and to the rendezvous network and converts communications between the devices into an appropriate format for the receiving device. This conversion is performed transparently so that the devices within the UPnP and rendezvous networks are not aware of the conversion performed by the UPnP rendezvous bridge. The UPnP devices send and receive communications in the UPnP format and the rendezvous devices send and receive communications in the rendezvous format. The UPnP rendezvous bridge converts communications between the UPnP devices and the rendezvous devices into the proper format for the receiving device.

The UPnP rendezvous bridge includes a programmable microprocessor which manipulates communications into the proper format for the receiving device and then transmits the manipulated communications to the receiving device. The UPnP rendezvous bridge is implemented within a stand-alone device coupled between the UPnP network and the rendezvous network. Alternatively, the UPnP rendezvous bridge is implemented within an appropriately configured device in one of the UPnP network or the rendezvous network.

A protocol conversion program is stored within a read only memory (ROM) and used by the microprocessor to perform the appropriate conversions. Alternatively, the programmable microprocessor is programmed for the appropriate conversions by a device coupled to the UPnP rendezvous bridge. In still a further alternate embodiment, the UPnP rendezvous bridge includes fixed firmware for performing the appropriate conversions. As communications are directed from the UPnP network to devices on the rendezvous network, the UPnP rendezvous bridge will manipulate those communications into the appropriate protocol for devices on the rendezvous network. As communications are directed from the rendezvous network to devices on the UPnP network, the UPnP rendezvous bridge will manipulate those communications into the appropriate protocol for the devices on the UPnP network.

The UPnP rendezvous bridge includes a UPnP proxy and a rendezvous proxy. The UPnP proxy associates with the devices in the UPnP network. The rendezvous proxy associates with the devices in the rendezvous network. The respective proxy receives the device/service information for the devices within its network, through an XML page or DNS record, as appropriate, and passes that information to the other proxy which builds the corresponding network data structures. Once a proxy receives the respective information for the devices within the other network, it builds a table that will be used to cross reference addressing and services information for the two different networks. Also, the table contains links to the addresses and services of the devices within the other network. Once a proxy receives information for a device in the other network, it generates a new device record and description in the appropriate format, DNS for the rendezvous network and XML for the UPnP network. The devices within each network can then access the devices in the other network through this generated device record. This allows the devices within the different networks to access the devices in their native protocols, with the proxies within the UPnP rendezvous bridge providing the appropriate interface and conversions. Each proxy communicates addressing and services information to the other proxy, thereby allowing devices within each network to have visibility into the other network. Each proxy is also responsible for building and maintaining the respective data entry structures into its respective network. When there is an update or status change to a device, the respective proxy corresponding to that device is responsible for notifying the other proxy of the change, which allows the other proxy to update the appropriate data entries.

To communicate with a device using the UPnP protocol, a device using the rendezvous protocol sends the communication intended for the UPnP device to the UPnP rendezvous bridge. After receiving a communication sent from a rendezvous device, the rendezvous proxy within the UPnP rendezvous bridge manipulates the communication into the appropriate format for the UPnP device, using the entry within the UpnP table corresponding to the device. The manipulated communication is then transmitted from the UPnP rendezvous bridge to the UPnP device. Likewise, to communicate with a device using the rendezvous protocol, a device using the UPnP protocol sends the communication intended for the rendezvous device to the UPnP rendezvous bridge. After receiving a communication sent from a UPnP device, the UPnP proxy within the UPnP rendezvous bridge manipulates the communication into the appropriate format for the rendezvous device, using the entry within the rendezvous table corresponding to the device. The manipulated communication is then transmitted from the UPnP rendezvous bridge to the rendezvous device.

The UPnP rendezvous bridge allows devices within the UPnP network to discover and control devices within the rendezvous network. The UPnP rendezvous bridge also allows devices within the rendezvous network to discover and control devices within the UPnP network. Using the UPnP rendezvous bridge, a device within the UPnP network or the rendezvous network can discover, communicate with and control a device within the other network.

Figure 2:
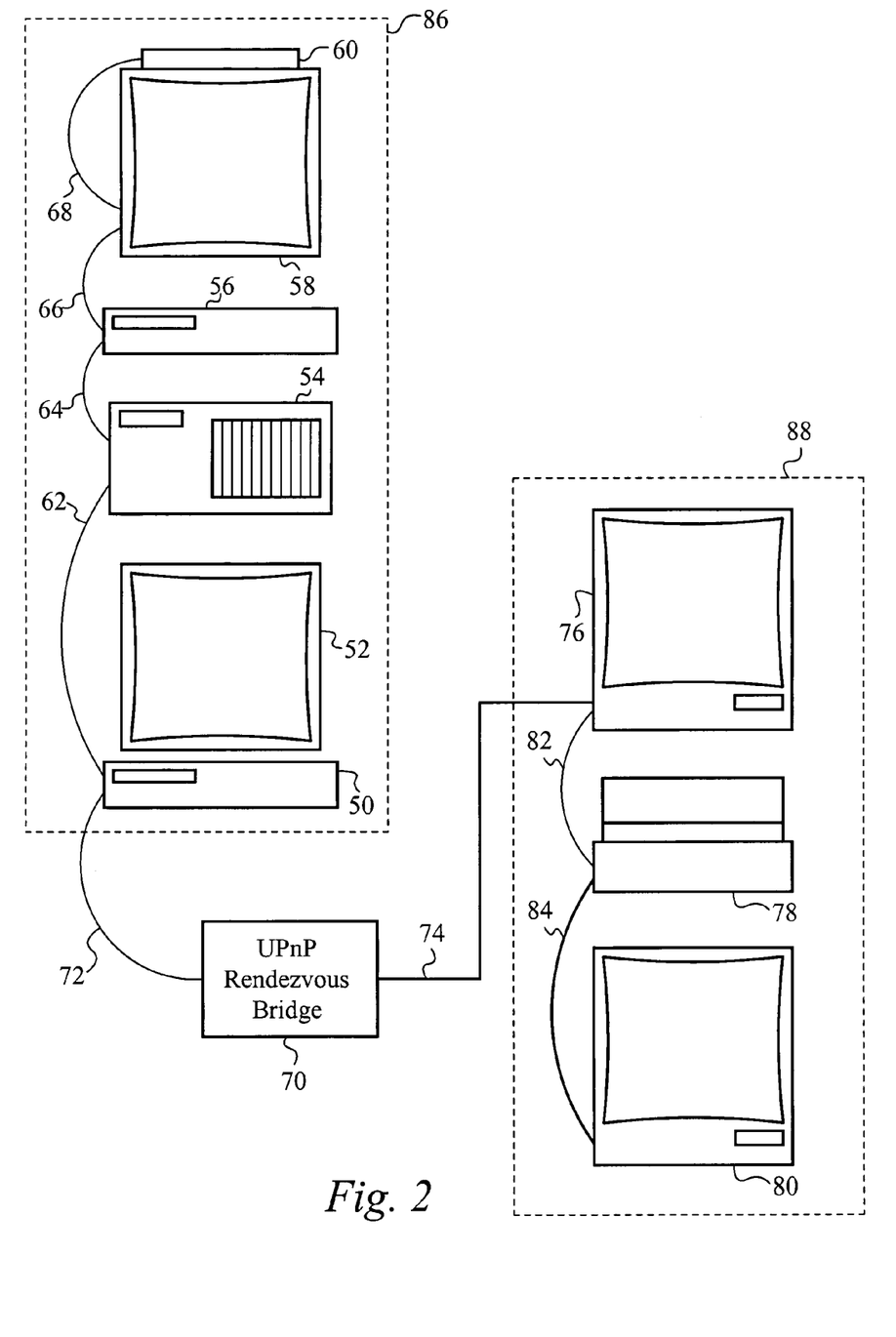
FIG. 2 illustrates an exemplary network of devices including a UPnP network of devices and a rendezvous network of devices bridged by a UPnP rendezvous bridge.

A block diagram of a UPnP rendezvous bridge coupled between an exemplary UPnP network and an exemplary rendezvous network is illustrated in FIG. 2. A settop box 60, a television 58, a DVD player 56, a CD jukebox 54 and a computer 50 together form a UPnP network 86. The settop box 60 is coupled to the television 58 by an input/output (I/O) bus 68. The television 58 is coupled to the DVD player 56 by an I/O bus 66. The DVD player 56 is coupled to the CD jukebox 54 by an I/O bus 64. The CD jukebox 54 is coupled to the computer 50 with an associated display 52 by an I/O bus 62. The computer 50 is coupled to the UPnP rendezvous bridge 70 by an I/O bus 72. The UPnP rendezvous bridge 70 is coupled to a computer system 76 by an I/O bus 74. The computer system 76 is coupled to a printer 78 by an I/O bus 82. The printer 78 is coupled to a computer system 80 by an I/O bus 84. The computer system 76, the printer 78 and the computer system 80 form a rendezvous network 88.

The devices coupled together within the rendezvous network 88 are devices with which devices coupled within the UPnP network 86 would not normally be able to communicate. However, the UPnP rendezvous bridge 70 allows devices and services to be discovered and communications to be sent between the devices within the UPnP network 86 and the rendezvous network 88. When communications are sent from a device within the UPnP network 86 to a device within the rendezvous network 88, the UPnP rendezvous bridge 70 converts the communication to the proper format for a communication with the rendezvous network 88 and directs that communication to the proper receiving device. Similarly, when communications are sent from a device within the rendezvous network 88 to a device within the UPnP network 86, the UPnP rendezvous bridge 70 converts the communication to the proper format for a communication with the UPnP network 86 and directs that communication to the proper receiving device.

In this manner, a device within the UPnP network 86, such as the computer 50, can discover and control a device within the rendezvous network 88, such as the printer 78. By sending communications through the UPnP rendezvous bridge 70, the computer 50 can send control signals and communications to the printer 78, to appropriately print a document. Similarly, a device within the rendezvous network 88, such as the computer system 80, can discover and control a device within the UPnP network 86, such as the television 58. By sending communications through the UPnP rendezvous bridge 70, the computer system 80 can send control signals and communications to the television 58, to play a video stored on the computer system 80.

Figure 3:
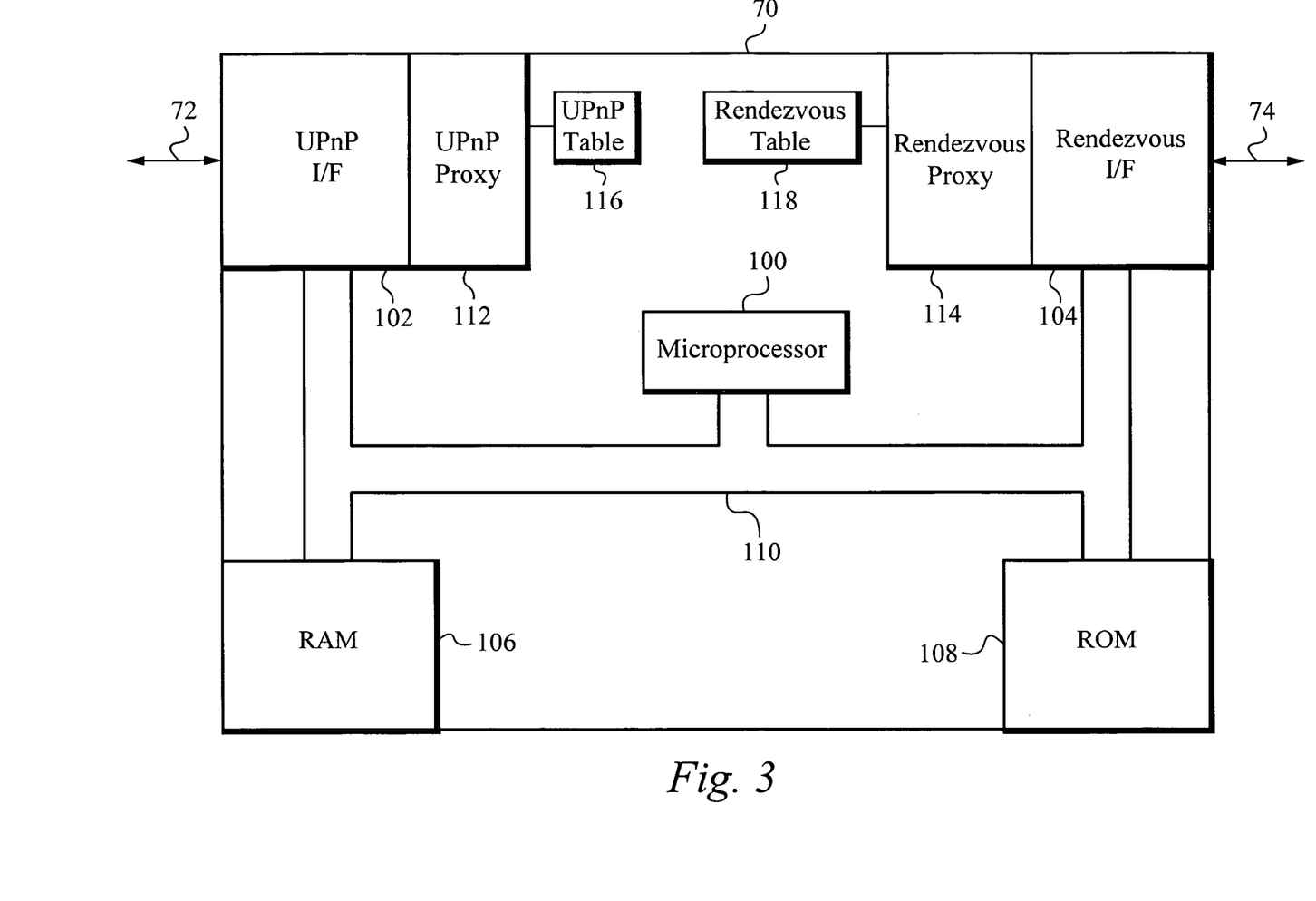
FIG. 3 illustrates a detailed block diagram schematic of the UPnP rendezvous bridge.

A detailed block diagram schematic of the UPnP rendezvous bridge 70 is illustrated within FIG. 3. The UPnP rendezvous bridge 70 includes a UPnP interface circuit 102, a rendezvous interface circuit 104, a microprocessor 100, a random access memory (RAM) 106 and a ROM 108, all coupled together by a system bus 110. The UPnP interface circuit 102 is also coupled to the UPnP network 86 by the I/O bus 72 to receive communications from and send communications to the devices coupled within the UPnP network 86. A UPnP proxy circuit 112 is part of the UPnP interface circuit 102. The UPnP proxy circuit 112 is coupled to a UPnP device table 116. The rendezvous interface circuit 104 is also coupled to the rendezvous network 88 by the I/O bus 74 to receive communications from and send communications to the devices coupled within the rendezvous network 88. A rendezvous proxy circuit 114 is part of the rendezvous interface circuit 104. The rendezvous proxy circuit 114 is coupled to a rendezvous device table 118. The ROM 108 includes the protocol conversion program, used by the microprocessor 100 to convert communications into the proper protocol for the device to which the communication is intended. Alternatively, the programmable microprocessor 100 is programmed for the appropriate conversions by a device within either the UPnP network 86 or the rendezvous network 88, coupled to the UPnP rendezvous bridge 70. In still a further alternate embodiment, the UPnP rendezvous bridge 70 includes fixed firmware for performing the appropriate conversions. The ROM 108 also stores identifying information about the UPnP rendezvous bridge 70 which is provided to the devices within the UPnP network 86 and the rendezvous network 88. The RAM 106 is available for general use by the microprocessor 100 during execution of the protocol conversion program and operation of the UPnP rendezvous bridge 70.

The UPnP rendezvous bridge 70 includes the UPnP interface circuit 102 which is coupled to the UPnP network 86. Through the UPnP interface circuit 102, the UPnP rendezvous bridge 70 communicates with devices coupled within the UPnP network 86. The UPnP rendezvous bridge 70 also includes the rendezvous interface circuit 104 which is coupled to the rendezvous network 88. Through the rendezvous interface circuit 104, the UPnP rendezvous bridge 70 communicates with devices coupled within the rendezvous network 88.

The UPnP proxy 112 receives the device/service information and updates for the devices within the UPnP network through an XML page and communicates this information to the rendezvous proxy 114. The rendezvous proxy 114 then generates device records, using this information, for each device within the UPnP network. These rendezvous device records for the UPnP devices are generated in DNS so that they are accessible to the devices in the rendezvous network. These rendezvous device records are then stored in the rendezvous table 118, which includes a record for each device within the rendezvous network and a rendezvous record for each device within the UPnP network. Each of these records includes the respective device's addresses and available services. Using these records, the devices within the rendezvous network are then able to communicate with devices within the UPnP network through the UPnP rendezvous bridge 70.

The rendezvous proxy 114 receives the device/service information and updates for the devices within the rendezvous network through a DNS record and communicates this information to the UPnP proxy 112. The UPnP proxy 112 then generates device records, using this information, for each device within the rendezvous network. These UPnP device records for the rendezvous devices are generated in XML so that they are accessible to the devices in the UPnP network. These UPnP device records are then stored in the UPnP table 116, which includes a record for each device within the UPnP network and a UPnP record for each device within the rendezvous network. Each of these records includes the respective device's addresses and available services. Using these records, the devices within the UPnP network are then able to communicate with devices within the rendezvous network through the UPnP rendezvous bridge 70.

Figure 4:
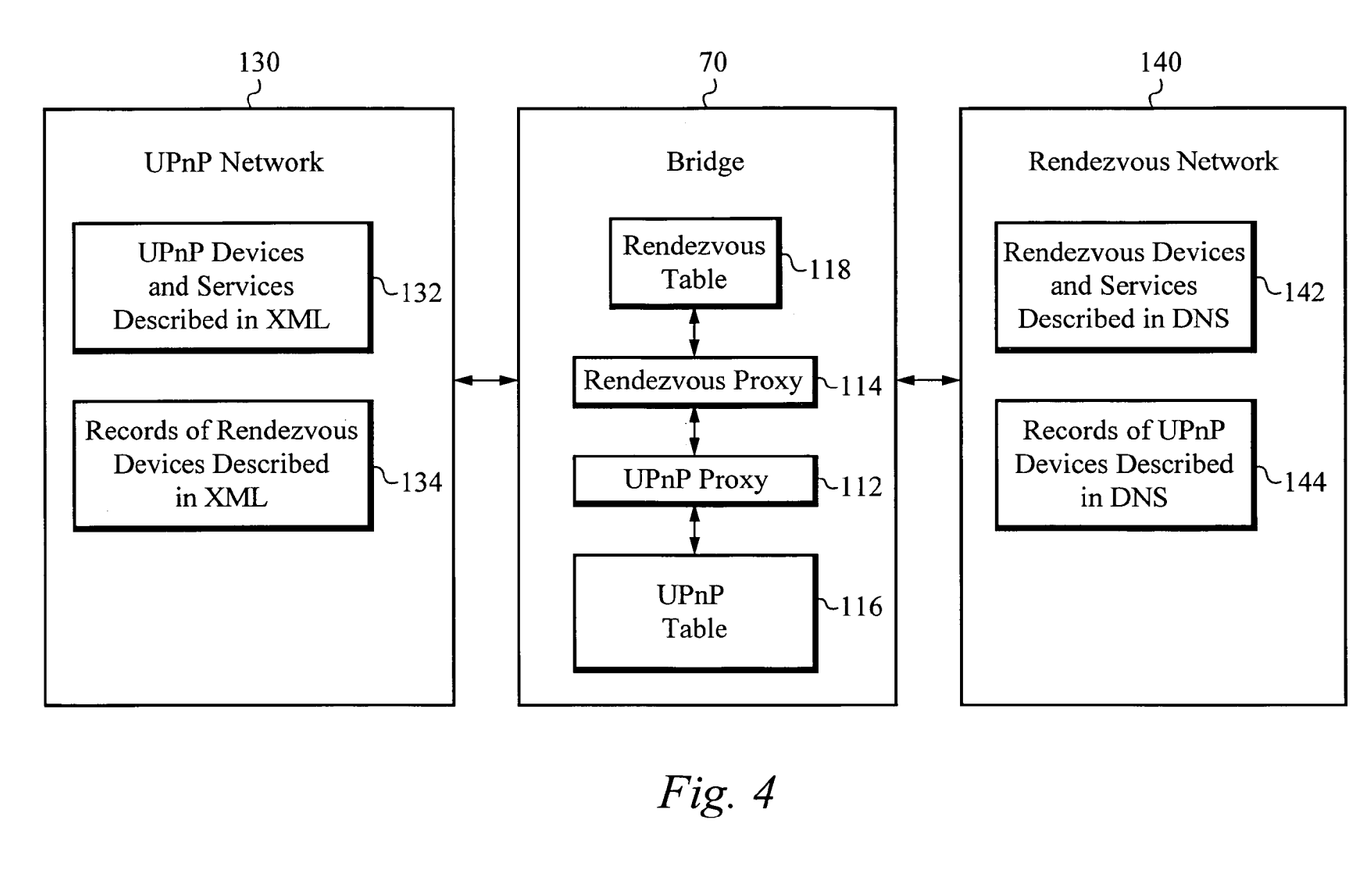
FIG. 4 illustrates a functional diagram of the UPnP rendezvous bridge and the devices in the UPnP network and the rendezvous network.

A functional diagram of the UPnP rendezvous bridge 70 and the devices in the UPnP network and the rendezvous network is illustrated in FIG. 4. The UPnP rendezvous bridge 70 includes the UPnP proxy 112, the UPnP table 116, the rendezvous proxy 114 and the rendezvous table 118, as described above. Within the UPnP network 130, UPnP devices and services 132 are described in XML and records of devices within the rendezvous network 134 are also described in XML. Within the rendezvous network 140, rendezvous devices and services 142 are described in DNS and records of devices within the UPnP network 144 are also described in DNS.

When a new UPnP device is added in the UPnP network, this new device is discovered by the UPnP proxy 112. The information for the new device discovered by the UPnP proxy 112 is then passed to the rendezvous proxy 114. Using this information, the rendezvous proxy 114 generates a device record in DNS for the new UPnP device. The DNS device record for the new UPnP device is then stored in the rendezvous table 118 to be used when a rendezvous device is communicating with the new UPnP device. This procedure is followed whenever there is a device added or deleted in the UPnP network, or there is an update regarding a device in the UPnP network.

When a new rendezvous device is added in the rendezvous network, this new device is discovered by the rendezvous proxy 114. The information for the new device discovered by the rendezvous proxy 114 is then passed to the UPnP proxy 112. Using this information, the UPnP proxy 112 generates a device record in XML for the new rendezvous device. The XML device record for the new rendezvous device is then stored in the UPnP table 116 to be used when a UPnP device is communicating with the new rendezvous device. This procedure is followed whenever there is a device added or deleted in the rendezvous network, or there is an update regarding a device in the rendezvous network.

In this manner, the UPnP proxy 112 generates and maintains UPnP accessible XML records for each rendezvous device and the rendezvous proxy 114 generates and maintains rendezvous accessible DNS records for each UPnP device. Through these records all devices in both the UPnP network and the rendezvous network are discoverable to each device within both the UPnP network and the rendezvous network. Further, using these device records, any device in the UPnP network and the rendezvous network has the ability to communicate with any other device in the UPnP network and the rendezvous network.

Figure 5:
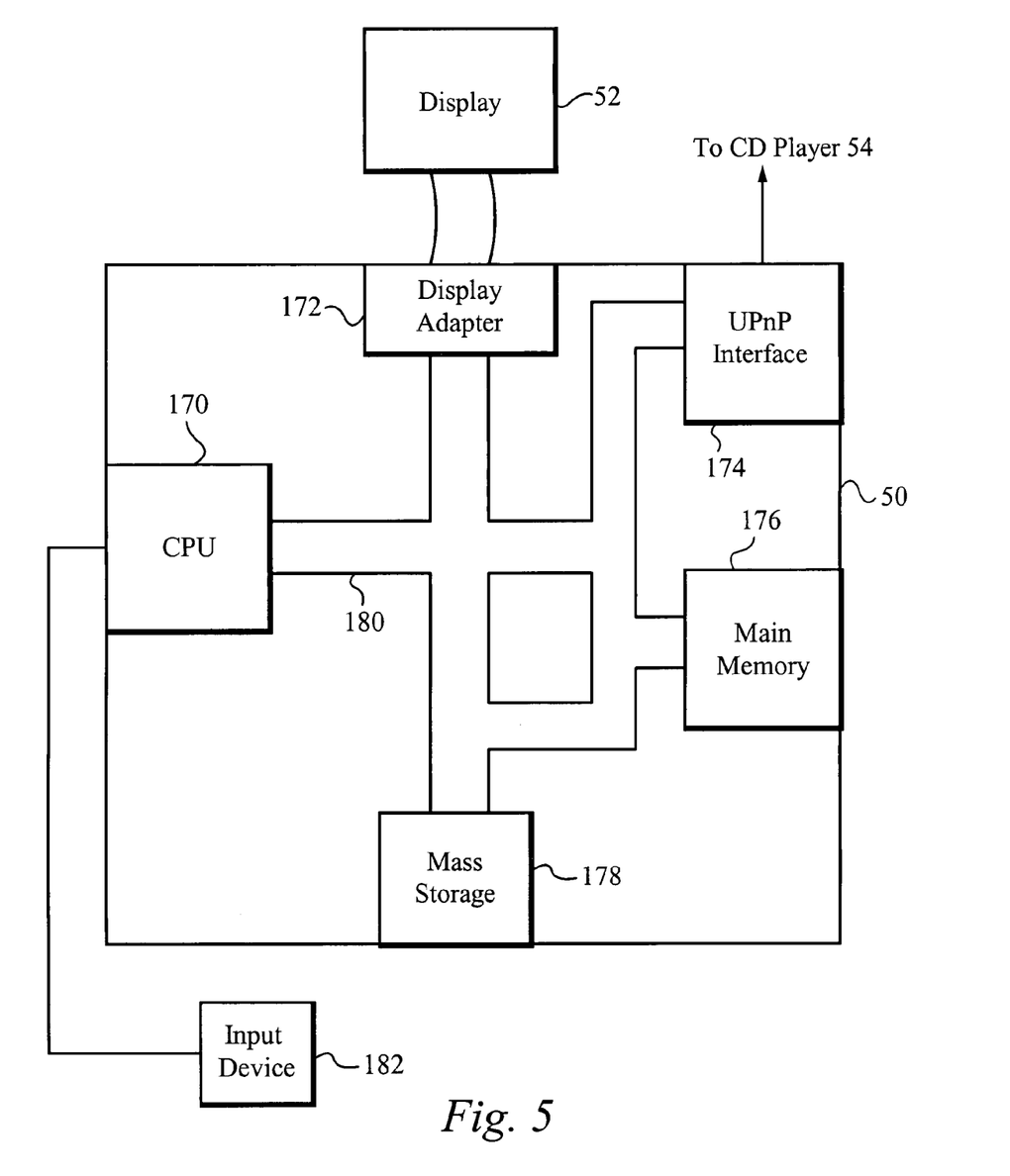
FIG. 5 illustrates a block diagram of the internal components of an exemplary computer system.

A block diagram of the internal components of the computer 50 is illustrated in FIG. 5. The exemplary computer 50 includes a CPU 170, a display adapter 172, a UPnP interface circuit 174, a main memory 176 and a mass storage device 178, all coupled together by a conventional bidirectional system bus 180. The UPnP interface 174 operates according to the UPnP protocol and couples the computer 50 to the UPnP network 86. The mass storage device 178 may include both fixed and removable media using any one or more of magnetic, optical or magneto-optical storage technology or any other available mass storage technology. The system bus 180 includes an address bus for addressing any portion of the memory 176 and 178. The system bus 180 also includes a data bus for transferring data between and among the CPU 170, the main memory 176, the display adapter 172, the mass storage device 178 and the UPnP interface 174.

The computer 50 is also coupled to a number of peripheral input and output devices including the input device 182 and the associated display 52. The input device 182 may be any appropriate input device including keyboard, mouse, touch screen or stylus.

The display adapter 172 interfaces between the components within the computer system 50 and the display 52. The display adapter 172 converts data received from the components within the computer 50 into signals which are used by the display 52 to generate images for display.

Prior to using the UPnP rendezvous bridge 70 to send a transmission or instruction to a device within the other network, a device within the UPnP network 86 or the rendezvous network 88, first discovers the devices within the other network. During this discovery process, the device determines that the UPnP rendezvous bridge 70 is one of the devices coupled within its network. The discovering device then sends a communication to the UPnP rendezvous bridge 70 requesting information about the devices coupled to the UPnP rendezvous bridge 70 within the other network. If it has not done so already, the UPnP rendezvous bridge 70 then performs a discovery operation to discover the devices within the other network not including the requesting device, utilizing the UPnP proxy 112 and the rendezvous proxy 114 to build the UPnP table 116 and the rendezvous table 118, respectively. After this discovery operation, the UPnP rendezvous bridge 70 then sends a communication back to the requesting device, in response to its request, informing the requesting device of the available devices and services within the other network, utilizing the entries within the appropriate UPnP table 116 or the rendezvous table 118. If the requesting device is a UPnP device, then the UPnP rendezvous bridge 70 sends the information corresponding to the entries in the UPnP table 116 which includes entries in XML relating to the devices in the rendezvous network. If the requesting device is a rendezvous device, then the UPnP rendezvous bridge 70 sends the information corresponding to the entries in the rendezvous table 118 which includes entries in DNS relating to the devices in the UPnP network. After learning of the available devices and services within the other network, the requesting device is then able to communicate with or control devices within the other network, through the UPnP rendezvous bridge 70.

To communicate with a device within the UPnP network, a rendezvous device sends a communication directed to the UPnP device, to the UPnP rendezvous bridge 70. The rendezvous proxy 114 then uses the entry within the rendezvous table 118 corresponding to the target UPnP device to determine the appropriate address for the target UPnP device. The communication is then appropriately converted by the UPnP rendezvous bridge 70 and sent to the target UPnP device.

To communicate with a device within the rendezvous network, a UPnP device sends a communication directed to the rendezvous device, to the UPnP rendezvous bridge 70. The UPnP proxy 112 then uses the entry within the UPnP table 116 corresponding to the target rendezvous device to determine the appropriate address for the target rendezvous device. The communication is then appropriately converted by the UPnP rendezvous bridge 70 and sent to the target rendezvous device.

The UPnP rendezvous bridge 70 receives communications from the sending network, manipulates the received communications into the proper format for communications on the receiving network and then transmits the manipulated communications to the appropriate device on the receiving network. The UPnP rendezvous bridge 70 converts transactions directed from a device within either the UPnP network 86 or the rendezvous network 88 to the appropriate format for the receiving device.

A communication from a device coupled to the UPnP network 86, directed to a device within the rendezvous network 88, is routed from the UPnP network 86 to the UPnP interface 102 of the UPnP rendezvous bridge 70. The microprocessor 100 then reads the communication received from the UPnP interface 102 and performs the necessary manipulations to the communication in order to configure the communication in the proper format for the rendezvous network 88, including using the appropriate entry in the UPnP table 116 to determine the address of the target device in the rendezvous network. The appropriately configured communication including the appropriate address information is then routed through the rendezvous interface 104 onto the rendezvous network 88. The converted communication is then routed to the appropriate receiving device on the rendezvous network 88.

A communication from a device coupled to the rendezvous network 88, directed to a device within the UPnP network 86, is routed from the rendezvous network 88 to the rendezvous interface 104 of the UPnP rendezvous bridge 70. The microprocessor 100 then reads the communication received from the rendezvous interface 104 and performs the necessary manipulations to the communication in order to configure the communication in the proper format for the UPnP network 86, including using the appropriate entry in the rendezvous table 118 to determine the address of the target device in the UPnP network. The appropriately configured communication including the appropriate address information is then routed through the UPnP interface 102 onto the UPnP network 86. The converted communication is then routed to the appropriate receiving device on the UPnP network 86.

Within the exemplary network of devices illustrated in FIG. 2, a UPnP rendezvous bridge 70 can be used to allow the computer 50, within the UPnP network of devices to communicate and control the printer 78, within the rendezvous network 88. After discovering that the UPnP rendezvous bridge 70 is coupled to the UPnP network 86, the computer 50 then sends a communication to the UPnP rendezvous bridge 70 requesting information about the devices coupled to the UPnP rendezvous bridge 70 through the rendezvous network 88. The rendezvous proxy 114 within the UPnP rendezvous bridge 70 then discovers the devices coupled within the rendezvous network 88 and the corresponding available services within the rendezvous network 88 and passes this information to the UPnP proxy 112, as described above, to put this information into the appropriate entries in the UPnP table 116. The UPnP rendezvous bridge 70 then sends a communication to the computer 50 informing the computer 50 that the computer system 76, the printer 78 and the computer system 80 are all coupled within the rendezvous network 88, using the XML entries within the UPnP table 116.

To control the operation of the printer 78 through the computer 50, a user enters a print command into the computer 50 selecting the printer 78. At the appropriate time, the computer 50 then sends appropriate communications to the UPnP rendezvous bridge 70 including data representing the document to be printed. After receiving the communications from the computer 50, the UPnP rendezvous bridge 70 then performs the necessary transformation of the communications and performs the necessary operation to deliver the transformed communications to the printer 78, through the rendezvous network 88, including using the XML entry in the UPnP table 116 corresponding to the printer 78, to determine the address of the printer 78. After receiving the transformed communications from the UPnP rendezvous bridge 70, the printer 78, if appropriate will send a response to the UPnP rendezvous bridge 70, such as an acknowledgment of receipt of the communications. The printer 78 will also print the document represented by the data within the communications, as appropriate. If the UPnP rendezvous bridge 70 receives a response from the printer 78, the UPnP rendezvous bridge 70 then performs the necessary transformation of the response and performs the necessary operation to deliver the transformed response to the computer 50, through the UPnP network 86, including using the entry in the rendezvous table 118 corresponding to the computer 50, to determine the address of the computer 50. In this manner, using the UPnP rendezvous bridge 70, a UPnP device, such as the computer 50, can communicate with and control a rendezvous device, such as the printer 78. Correspondingly, in a similar manner, a rendezvous device can also communicate with and control a UPnP device using the UPnP rendezvous bridge 70.

Figure 6A:
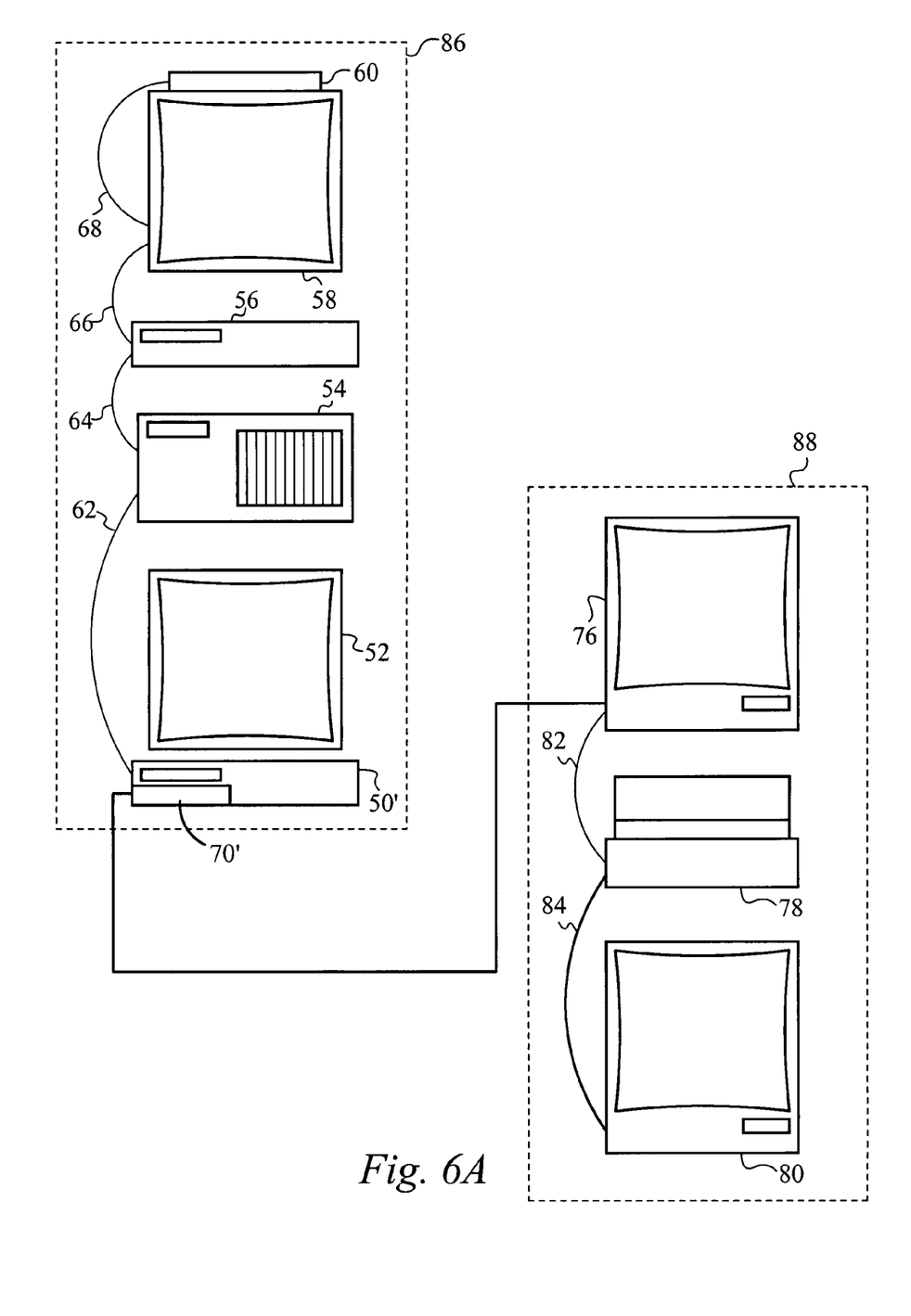
FIG. 6A illustrates an exemplary network of devices including a UPnP network of devices and a rendezvous network of devices including a UPnP rendezvous bridge included within a device within the rendezvous network of devices.
Figure 6B:
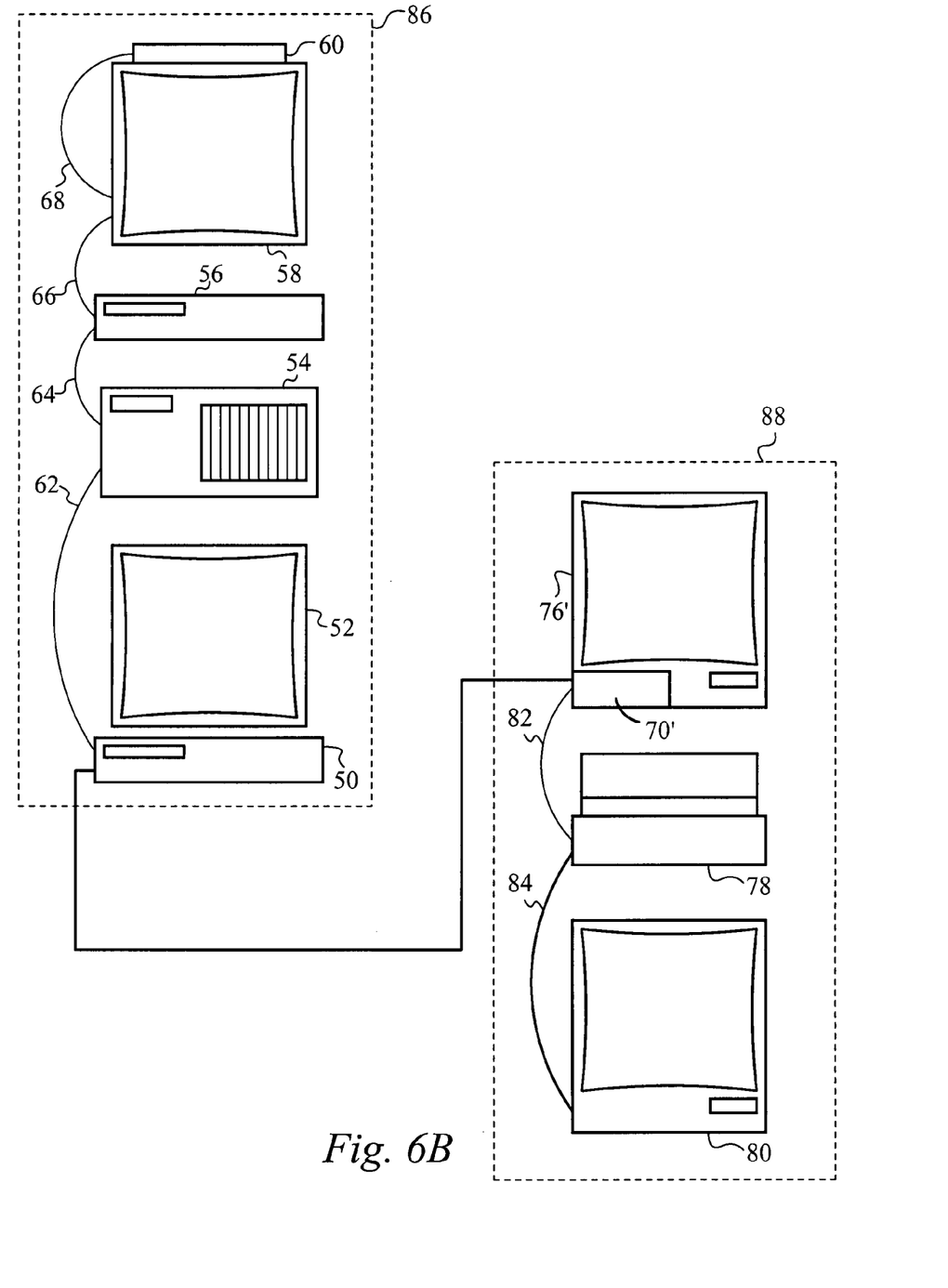
FIG. 6B illustrates an exemplary network of devices including a UPnP network of devices and a rendezvous network of devices including a UPnP rendezvous bridge included within a device within the UPnP network of devices.

A UPnP rendezvous bridge, as described above; appropriately bridges a UPnP network of one or more devices with a rendezvous network of one or more devices. The UPnP rendezvous bridge appropriately allows device and service discovery between the UPnP network and the rendezvous network, under the control of the UPnP proxy 112 and the rendezvous proxy 114, and utilizing the UPnP table 116 and the rendezvous table 118, as described above. The UPnP rendezvous bridge is coupled to the UPnP network and to the rendezvous network and converts communications between the devices into an appropriate format for the receiving device. This conversion is performed transparently so that the devices within the UPnP and rendezvous networks are not aware of the conversion performed by the UPnP rendezvous bridge. The UPnP rendezvous bridge includes a programmable microprocessor which manipulates communications into the proper format for the receiving device and then transmits the manipulated communications to the receiving device. The UPnP rendezvous bridge is implemented within a stand-alone device coupled between the UPnP network and the rendezvous network. Alternatively, the UPnP rendezvous bridge is implemented within an appropriately configured device in one of the UPnP network, such as the bridge 70' within the computer 50' as shown in FIG. 6A, or the rendezvous network, such as the bridge 70" within the computer 76' as shown in FIG. 6B.

A protocol conversion program is stored within a read only memory (ROM) and used by the microprocessor to perform the appropriate conversions. Alternatively, the programmable microprocessor is programmed for the appropriate conversions by a device coupled to the UPnP rendezvous bridge. In still a further alternate embodiment, the UPnP rendezvous bridge includes fixed firmware for performing the appropriate conversions. As communications are directed from the UPnP network to devices on the rendezvous network, the UPnP rendezvous bridge will manipulate those communications into the appropriate protocol for devices on the rendezvous network. As communications are directed from the rendezvous network to devices on the UPnP network, the UPnP rendezvous bridge will manipulate those communications into the appropriate protocol for the devices on the UPnP network.

To communicate with a device using the UPnP protocol, a device using the rendezvous protocol sends the communication intended for the UPnP device to the UPnP rendezvous bridge. After receiving a communication sent from a rendezvous device, the UPnP rendezvous bridge manipulates the communication into the appropriate format for the UPnP device, utilizing the appropriate entry in the rendezvous table 118. The manipulated communication is then transmitted from the UPnP rendezvous bridge to the UPnP device. Likewise, to communicate with a device using the rendezvous protocol, a device using the UPnP protocol sends the communication intended for the rendezvous device to the UPnP rendezvous bridge. After receiving a communication sent from a UPnP device, the UPnP rendezvous bridge manipulates the communication into the appropriate format for the rendezvous device, utilizing the appropriate entry in the UPnP table 116. The manipulated communication is then transmitted from the UPnP rendezvous bridge to the rendezvous device.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. A method of bridging communications between a universal plug and play type device and a rendezvous type device comprising:
   a. receiving a communication from the universal plug and play type device for the rendezvous type device at a bridge;
   b. converting the communication into the rendezvous type protocol thereby forming a converted communication; and
   c. transmitting the converted communication from the bridge to the rendezvous type device;
   wherein the rendezvous type protocol utilizes Internet Protocol and the bridge comprises a rendezvous type interface circuit that is configured to couple to the rendezvous type device operating under a rendezvous type protocol, and further wherein the rendezvous type interface circuit comprises a rendezvous type proxy which maintains a table of entries, at least one entry corresponding to the universal plug and play type device.

2. The method as claimed in claim 1 wherein the universal plug and play type device is coupled within a network of universal plug and play type devices.

3. The method as claimed in claim 1 wherein the rendezvous type device is coupled within a network of rendezvous type devices.

4. The method as claimed in claim 1 wherein converting the communication is performed by a conversion circuit.

5. The method as claimed in claim 4 wherein the conversion circuit is programmed by the universal plug and play type device or the rendezvous type device.

6. A method of bridging communications between a rendezvous type device and a universal plug and play type device comprising:
   a. receiving a communication from the rendezvous type device for the universal plug and play type device at a bridge;
   b. converting the communication into the universal plug and play type protocol thereby forming a converted communication; and
   c. transmitting the converted communication from the bridge to the universal plug and play type device;
   wherein the rendezvous type device utilizes Internet Protocol and the bridge comprises a rendezvous type interface circuit that is configured to couple to the rendezvous type device operating under a rendezvous type protocol, and further wherein the rendezvous type interface circuit comprises a rendezvous type proxy which maintains a table of entries, at least one entry corresponding to the universal plug and play type device.

7. The method as claimed in claim 6 wherein the universal plug and play type device is coupled within a network of universal plug and play type devices.

8. The method as claimed in claim 6 wherein the rendezvous type device is coupled within a network of rendezvous type devices.

9. The method as claimed in claim 6 wherein converting the communication is performed by a conversion circuit.

10. The method as claimed in claim 9 wherein the conversion circuit is programmed by the universal plug and play type device or the rendezvous type device.

11. A converter configured to couple between a universal plug and play type device and a rendezvous type device to convert communications between the universal plug and play type device and the rendezvous type device into proper formats, comprising:
   a. a universal plug and play type interface circuit configured to couple to a universal plug and play type device operating under a universal plug and play type protocol;
   b. a rendezvous type interface circuit configured to couple to a rendezvous type device operating under a rendezvous type protocol, wherein the rendezvous type interface circuit comprises a rendezvous type proxy which maintains a table of entries, at least one entry corresponding to the universal plug and play type device; and
   c. a conversion circuit coupled between the universal plug and play type interface circuit and the rendezvous type interface circuit, wherein the conversion circuit converts communications directed from the universal plug and play type device to the rendezvous type device into the rendezvous type protocol, and further wherein the conversion circuit converts communications directed from the rendezvous type device to the universal plug and play type device into the universal plug and play type protocol,
   wherein the rendezvous type protocol utilizes Internet Protocol.

12. The converter as claimed in claim 11 wherein the universal plug and play type device is coupled within a network of universal plug and play type devices.

13. The converter as claimed in claim 11 wherein the rendezvous type device is coupled within a network of rendezvous type devices.

14. The converter as claimed in claim 11 wherein a conversion program used by the conversion circuit is stored within the conversion circuit.

15. The converter as claimed in claim 11 wherein the conversion circuit is programmed by the universal plug and play type device or the rendezvous type device.

16. The converter as claimed in claim 11 wherein the converter is a stand-alone device.

17. The converter as claimed in claim 11 wherein the converter is implemented within the universal plug and play type device or the rendezvous type device.

18. The converter as claimed in claim 11 wherein the universal plug and play type interface circuit comprises a universal plug and play type proxy which maintains a table of entries, each entry corresponding to a rendezvous type device.

19. A converter configured for coupling between a universal plug and play type device and a rendezvous type device to convert communications between the universal plug and play type device and the rendezvous type device into proper formats, comprising:

a. means for interfacing to a universal plug and play type device configured for coupling to the universal plug and play type device operating under a universal plug and play type protocol;
   b. means for interfacing to a rendezvous type device configured for coupling to the rendezvous type device operating under a rendezvous type protocol, wherein the means for interfacing to a rendezvous type device comprises a rendezvous type proxy which maintains a table of entries, at least one entry corresponding to the universal plug and play type device; and
   c. means for converting coupled between the means for interfacing to a universal plug and play type device and the means for interfacing to a rendezvous type device, wherein the means for converting converts communications directed from the universal plug and play type device to the rendezvous type device into the rendezvous type protocol, and further wherein the means for converting converts communications directed from the rendezvous type device to the universal plug and play type device into the universal plug and play type protocol;
   wherein the rendezvous type protocol utilizes Internet Protocol.

20. The converter as claimed in claim 19 wherein the universal plug and play type device is coupled within a network of universal plug and play type devices.

21. The converter as claimed in claim 19 wherein the rendezvous type device is coupled within a network of rendezvous type devices.

22. The converter as claimed in claim 19 wherein a conversion program used by the means for converting is stored within the means for converting.

23. The converter as claimed in claim 19 wherein the means for converting is programmed by the universal plug and play type device or the rendezvous type device.

24. The converter as claimed in claim 19 wherein the converter is a stand-alone device.

25. The converter as claimed in claim 19 wherein the converter is implemented within the universal plug and play type device or the rendezvous type device.

26. The converter as claimed in claim 19 wherein the means for interfacing to a universal plug and play type device comprises a universal plug and play type proxy which maintains a table of entries, each entry corresponding to a rendezvous type device.

27. A bridge device configured for coupling between a universal plug and play type device and a rendezvous type device for converting communications between the universal plug and play type device and the rendezvous type device into proper formats, comprising:
   a. a universal plug and play type interface circuit configured for coupling to the universal plug and play type device operating under a universal plug and play type protocol;
   b. a rendezvous type interface circuit configured for coupling to the rendezvous type device operating under a rendezvous type protocol, wherein the rendezvous type interface circuit comprises a rendezvous type proxy which maintains a table of entries, at least one entry corresponding to the universal plug and play type device; and
   c. a conversion circuit coupled between the universal plug and play type interface circuit and the rendezvous type interface circuit, wherein the conversion circuit converts communications directed from the universal plug and play type device to the rendezvous type device into the rendezvous type protocol, and further wherein the conversion circuit converts communications directed from the rendezvous type device to the universal plug and play type device into the universal plug and play type protocol;

wherein the rendezvous type protocol utilizes Internet Protocol.

28. The bridge as claimed in claim 27 wherein the universal plug and play type device is coupled within a network of universal plug and play type devices.

29. The bridge as claimed in claim 27 wherein the rendezvous type device is coupled within a network of rendezvous type devices.

30. The bridge as claimed in claim 27 wherein a conversion program used by the conversion circuit is stored within the conversion circuit.

31. The bridge as claimed in claim 27 wherein the conversion circuit is programmed by the universal plug and play type device or the rendezvous type device.

32. The bridge as claimed in claim 27 wherein the bridge is a stand-alone device.

33. The bridge as claimed in claim 27 wherein the bridge is implemented within the universal plug and play type device or the rendezvous type device.

34. The bridge as claimed in claim 27 wherein the universal plug and play type interface circuit comprises a universal plug and play type proxy which maintains a table of entries, each entry corresponding to a rendezvous type device.

35. A network of devices, operating under a plurality of protocols, the network of devices comprising:
 a. one or more universal plug and play type devices operating under a universal plug and play type protocol;
 b. one or more rendezvous type devices operating under a rendezvous type protocol; and
 c. a converter coupled to the universal plug and play type devices and the rendezvous type devices for converting communications between the universal plug and play type devices and the rendezvous type devices into proper formats, comprising:
  i. a universal plug and play type interface circuit coupled to the universal plug and play type devices, wherein the universal plug and play type interface circuit maintains a universal plug and play table of all the rendezvous type devices in the network;
  ii. a rendezvous type interface circuit coupled to the rendezvous type devices, wherein the rendezvous type interface circuit maintains a rendezvous table of all the plug and play type devices in the network; and
  iii. a conversion circuit coupled to universal plug and play type interface circuit and the rendezvous type interface circuit, wherein the conversion circuit converts communications directed from the universal plug and play type devices to the rendezvous type devices into the rendezvous type protocol, and further wherein the conversion circuit converts communications directed from the rendezvous type devices to the universal plug and play type devices into the universal plug and play type protocol,
  wherein the rendezvous type protocol utilizes Internet Protocol, and further wherein the plug and play table and the rendezvous table are formatted such that each device within the network is discoverable by each other device in the network.

36. The network of devices as claimed in claim 35 wherein a conversion program used by the conversion circuit is stored within the conversion circuit.

37. The network of devices as claimed in claim 35 wherein the conversion circuit is programmed by a universal plug and play type device or a rendezvous type device.

38. The network of devices as claimed in claim 35 wherein the converter is a stand-alone device coupled between the universal plug and play type devices and the rendezvous type devices.

39. The network of devices as claimed in claim 35 wherein the converter is implemented within the universal plug and play type device or the rendezvous type device.

40. The network of devices as claimed in claim 35 wherein the universal plug and play type interface circuit comprises a universal plug and play type proxy which maintains a table of entries, each entry corresponding to a rendezvous type device.

41. The network of devices as claimed in claim 35 wherein the rendezvous type interface circuit comprises a rendezvous type proxy which maintains a table of entries, each entry corresponding to a universal plug and play type device.

42. A network of devices, operating under a plurality of protocols, the network of devices comprising:
 a. one or more universal plug and play type devices operating under a universal plug and play type protocol;
 b. one or more rendezvous type devices operating under a rendezvous type protocol; and
 c. a converter coupled to the universal plug and play type devices and the rendezvous type devices for converting communications between the universal plug and play type devices and the rendezvous type devices into proper formats, comprising:
  i. a universal plug and play type interface circuit coupled to the universal plug and play type devices, wherein the universal plug and play type interface circuit comprises a universal plug and play type proxy which maintains a table of rendezvous entries, each rendezvous entry corresponding to a rendezvous type device;
  ii. a rendezvous type interface circuit coupled to the rendezvous type devices, wherein the rendezvous type interface circuit comprises a rendezvous type proxy which maintains a table of universal plug and play entries, each universal plug and play entry corresponding to a universal plug and play type device; and
  iii. a conversion circuit coupled to universal plug and play type interface circuit and the rendezvous type interface circuit, wherein the conversion circuit converts communications directed from the universal plug and play type devices to the rendezvous type devices into the rendezvous type protocol, and further wherein the conversion circuit converts communications directed from the rendezvous type devices to the universal plug and play type devices into the universal plug and play type protocol, wherein a conversion program used by the conversion circuit is stored within the conversion circuit, wherein the conversion circuit is programmed by a universal plug and play type device or a rendezvous type device, and
  wherein the rendezvous type protocol utilizes Internet Protocol.

43. A method of bridging communications between a universal plug and play type device and a rendezvous type device, wherein the universal plug and play type device and the rendezvous type device are coupled together through one or more networks operating according to Internet Protocol, the method comprising:

a. receiving a communication from the universal plug and play type device for the rendezvous type device at a bridge;
b. converting the communication into the rendezvous type protocol thereby forming a converted communication; and
c. transmitting the converted communication from the bridge over the one or more Internet Protocol networks to the rendezvous type device;
wherein the rendezvous type protocol utilizes the Internet Protocol and the bridge comprises a rendezvous type interface circuit that is configured to couple to the rendezvous type device operating under a rendezvous type protocol, and further wherein the rendezvous type interface circuit comprises a rendezvous type proxy which maintains a table of entries, at least one entry corresponding to the universal plug and play type device.

44. A method of bridging communications between a rendezvous type device and a universal plug and play type device, wherein the rendezvous type device and the universal plug and play type device are coupled together through one or more networks operating according to Internet Protocol, the method comprising:
a. receiving a communication from the rendezvous type device for the universal plug and play type device at a bridge;
b. converting the communication into the universal plug and play type protocol thereby forming a converted communication; and
c. transmitting the converted communication from the bridge over the one or more Internet Protocol networks to the universal plug and play type device;
wherein the rendezvous type device utilizes the Internet Protocol and the bridge comprises a rendezvous type interface circuit that is configured to couple to the rendezvous type device operating under a rendezvous type protocol, and further wherein the rendezvous type interface circuit comprises a rendezvous type proxy which maintains a table of entries, at least one entry corresponding to the universal plug and play type device.

\* \* \* \* \*